(12) United States Patent
Celinski et al.

(10) Patent No.: US 8,462,627 B2
(45) Date of Patent: Jun. 11, 2013

(54) MEDIA DATA TRANSFER IN A NETWORK ENVIRONMENT

(75) Inventors: Tomasz Celinski, Elizabeth Bay (AU); Peter Celinski, Bangor (AU); Stuart Bryce, Crows Nest (AU); Max Gordon Ramsay, Balmain (AU)

(73) Assignee: Altec Lansing Australia Pty Ltd, Sydney (AU)

( * ) Notice: Subject to any disclaimer, the term of this patent is extended or adjusted under 35 U.S.C. 154(b) by 947 days.

(21) Appl. No.: 11/563,323

(22) Filed: Nov. 27, 2006

(65) Prior Publication Data

US 2007/0153806 A1    Jul. 5, 2007

Related U.S. Application Data

(60) Provisional application No. 60/755,237, filed on Dec. 30, 2005.

(51) Int. Cl.
*H04M 11/06* (2006.01)

(52) U.S. Cl.
USPC .............. 370/235; 370/379; 455/68; 455/69

(58) Field of Classification Search
USPC .............. 455/68, 69; 370/379, 473, 235, 231, 370/278, 282
See application file for complete search history.

(56) References Cited

U.S. PATENT DOCUMENTS

| 5,272,525 A | 12/1993 | Borchardt et al. | 358/83 |
|---|---|---|---|
| 5,319,716 A | 6/1994 | McGreevy | 381/79 |
| 5,349,386 A | 9/1994 | Borchardt et al. | 348/485 |
| 5,406,634 A | 4/1995 | Anderson et al. | 381/82 |
| 5,491,839 A | 2/1996 | Schotz | 455/66 |
| 5,832,024 A | 11/1998 | Schotz et al. | 375/200 |
| 5,946,343 A | 8/1999 | Schotz et al. | 375/200 |
| 6,466,832 B1 | 10/2002 | Zuqert et al. | 700/94 |

(Continued)

FOREIGN PATENT DOCUMENTS

| CN | 1710587 | 12/2005 |
|---|---|---|
| EP | 1380918 | 1/2004 |

(Continued)

OTHER PUBLICATIONS

Tom Blank and Robert Atkinson "Synchronization Strategies for IP Networked Home Audio Equipment," Microsoft Corp., Redmond, WA. Presented at the 2005 AES 19th UK Conference called "Convergence-The Impact of Computers and Networking on Future Audio Technology." Downloaded Apr. 10, 2006 at http://www.corinex.com/pdf/press/eng/microsoft.pdf.

(Continued)

*Primary Examiner* — Kamran Afshar
*Assistant Examiner* — Shahriar Behnamian
(74) *Attorney, Agent, or Firm* — Tarolli, Sundheim, Covell & Tummino LLP (57) ABSTRACT

In a wireless network environment, a method of transmitting data from a source device to a set of sink devices, the method comprising the steps of: (a) initially the source device broadcasting packet data collectively to each of the sink devices; (b) the sink devices collecting packet data and identifying missing packets that have been missed; (c) upon a sink device detecting a missed a packet, the sink device separately requesting the transmission of the missed packet by the source device; and (d) the source device separately sending missed data packets.

15 Claims, 3 Drawing Sheets

U.S. PATENT DOCUMENTS

| | | | |
|---|---|---|---|
| 6,608,907 B1 | 8/2003 | Lee | 381/311 |
| 6,614,849 B1 | 9/2003 | Chan et al. | 375/259 |
| 6,747,996 B2 | 6/2004 | Holloway et al. | 370/503 |
| 6,868,161 B1 | 3/2005 | Yamada et al. | 381/1 |
| 6,954,641 B2 | 10/2005 | McKenna et al. | |
| 7,023,883 B1 | 4/2006 | Lui et al. | 370/503 |
| 7,024,003 B2 | 4/2006 | Dupeire | 381/79 |
| 7,031,329 B2 | 4/2006 | Lipsanen | 370/408 |
| 2002/0065929 A1 | 5/2002 | Kamentsky et al. | |
| 2002/0150053 A1 | 10/2002 | Gray, III et al. | 370/252 |
| 2003/0056136 A1 | 3/2003 | Aweya et al. | 713/400 |
| 2003/0161302 A1* | 8/2003 | Zimmermann et al. | 370/363 |
| 2003/0206549 A1* | 11/2003 | Mody et al. | 370/390 |
| 2004/0100942 A1 | 5/2004 | Blank et al. | 370/352 |
| 2004/0114576 A1* | 6/2004 | Itoh et al. | 370/352 |
| 2004/0160928 A1 | 8/2004 | Perlman | |
| 2004/0252400 A1 | 12/2004 | Blank et al. | 360/70 |
| 2005/0074010 A1* | 4/2005 | Kim et al. | 370/394 |
| 2005/0131558 A1 | 6/2005 | Braithwaite et al. | 700/94 |
| 2005/0133764 A1 | 6/2005 | Joanicot et al. | |
| 2005/0136839 A1 | 6/2005 | Seshadri et al. | 455/41.2 |
| 2005/0141469 A1 | 6/2005 | Miller et al. | |
| 2005/0169193 A1 | 8/2005 | Black et al. | |
| 2005/0192992 A1 | 9/2005 | Reed et al. | 707/101 |
| 2005/0195986 A1 | 9/2005 | McCarty et al. | 381/79 |
| 2005/0254661 A1 | 11/2005 | Castaneda et al. | 381/26 |
| 2005/0259754 A1 | 11/2005 | Ho et al. | 375/240.28 |
| 2005/0288805 A1 | 12/2005 | Moore et al. | |
| 2006/0023652 A1* | 2/2006 | Vedantham et al. | 370/312 |
| 2006/0132715 A1 | 6/2006 | Ho et al. | 353/15 |
| 2006/0171544 A1 | 8/2006 | Chung | 381/77 |
| 2006/0174116 A1 | 8/2006 | Balfanz et al. | |
| 2006/0287745 A1 | 12/2006 | Richenstein et al. | 700/94 |
| 2007/0003073 A1 | 1/2007 | Iriarte | 381/77 |
| 2007/0192833 A1 | 8/2007 | Ho et al. | |

FOREIGN PATENT DOCUMENTS

| | | |
|---|---|---|
| EP | 1 646 109 A1 | 4/2006 |
| GB | 2402302 | 8/2005 |
| JP | 2005-341618 | 12/2005 |
| JP | 2006-060615 | 3/2006 |
| TW | 246865 B | 1/2006 |
| WO | WO 03/026232 A1 | 3/2003 |
| WO | WO 03/096741 | 11/2003 |
| WO | WO 2005/115051 | 12/2005 |
| WO | WO 2006/089256 A2 | 4/2006 |

OTHER PUBLICATIONS

David L. Mills, "Network Time Protocol (Version 3): Specification, Implementation and Analysis," Network Working Group, Internet draft standard RFC 1305, Mar. 1992. Available online at: http://www.faqs.org/rfcs/rfc1305.html.

D. Mills, "Simple Network Time Protocol (SNTP) Version 4 for IPv4, IPv6 and OSI," Network Working Group, Internet draft standard RFC 2030, Oct. 1996. Available online at: http://www.faqs.org/rfcs/rfc2030.html.

DigiLinX, "Frequently Asked Questions," NetStreams L.L.C., Austin, TX, downloaded Sep. 29, 2005. Available online at: http://www.sirkom.com/NetStreams/DigiLinX/digilinx_faq.pdf.

Men Muheim, "Design and Implementation of a Commodity Audio System," PhD. Dissertation, ETH, Zurich, Switzerland, ETH Diss. No. 15198, 2003. Available pool/diss/fulltext/eth15198.pdf.

"Logitech Delivers 5.1 Surround Sound Without the Cables; With Dual Wireless Rear Speakers, Logitech Z-5450 Digital System Combines Power and Cordless Freedom; Logitech Z-4 2.1 Speakers Feature New 3-Driver Design," Business Wire, Fremont, CA, Sep. 7, 2005. Downloaded Sep. 28, 2005 from: http://www.tmcnet.com/usubmit/2005/sep/1179330.htm.

Dr. Men Muheim, "Design and Implementation of a Commodity Audio System," Audio Engineering Society Convention Paper, presented at the $116^{th}$, Convention, May 8-11, 2004, Berlin Germany.

T. Blank, B. Atkinson, M. Isard, J.D. Johnston and K. Olynyk, "An Internet Protocol (IP) Sound System," Audio Engineering Society Convention Paper, presented at the $117^{h}$, Convention, Oct. 28-31, 2004, San Francisco, CA. Available online at: http://research.microsoft.com/users/misard/papers/aes2004.pdf.

"NetStreams Cooperates with Polk Audio to Introduce IP Networked Loudspeakers," NetStreams L.L.C., Austin, TX, Mar. 17, 2004. Downloaded Sep. 28, 2005 at: http://hometheaterhifi.com/forum/showthread.php?t=451.

"Audio/Video: NICT develops network-connectable speakers," TechJapan, Jun. 28, 2005. Downloaded Mar. 7, 2007. Available online at:http://www.techjapan.com/Article1022.html.

"StreamNet Technology: How Streamnet Makes a Difference," NetStreams L.L.C., Austin, TX, 2005. Downloaded Sep. 29, 2005 from: http://www.netstreams.com.

Supp. European Search Report—6 pgs., Dec. 10, 2012, Aveca Systems Pty Ltd.

* cited by examiner

MEDIA DATA TRANSFER IN A NETWORK ENVIRONMENT

RELATED PATENT APPLICATIONS

The present invention claims benefit of and is a conversion of U.S. Provisional Patent Application 60/755,237 filed 30 Dec. 2005 to inventors Celinski et al., titled MEDIA DATA TRANSFER IN A NETWORK ENVIRONMENT, The contents of such provisional patent application 60/755,237 are incorporated herein by reference.

The present invention is related to U.S. patent application Ser. No. 11/559,360 filed 13 Nov. 2006 to inventors Celinski et al., titled MEDIA DATA SYNCHRONIZATION IN A WIRELESS NETWORK, The contents of such related patent application Ser. No. 11/559,360 are incorporated herein by reference.

FIELD OF THE INVENTION

The present invention relates to the field of wireless local audio transmission and, in particular, data transfer in a high quality wireless audio system.

BACKGROUND OF THE INVENTION

Wireless transmission of multimedia data for playback in a multi-speaker environment, e.g., with a video display has become very popular in recent years. Wireless transmission eliminates the need for wires that are annoying and that limit flexibility. Local wireless transmission is usable, for example, in portable home telephone systems, stereo systems, surround sound systems, and home theater systems.

U.S. Pat. No. 5,272,525 titled SYSTEM FOR LOCAL WIRELESS TRANSMISSION OF SIGNALS AT FREQUENCIES ABOVE 900 MHZ, U.S. Pat. No. 5,349,386 titled WIRELESS SIGNAL TRANSMISSION SYSTEMS, METHODS AND APPARATUS, U.S. Pat. No. 5,319,716 titled WIRELESS CD/AUTOMOBILE RADIO ADAPTER, U.S. Pat. No. 5,491,839 titled SYSTEM FOR SHORT RANGE TRANSMISSION OF A PLURALITY OF SIGNALS SIMULTANEOUSLY OVER THE AIR USING HIGH FREQUENCY CARRIERS and U.S. Pat. No. 6,466,832 titled HIGH QUALITY WIRELESS AUDIO SPEAKERS DISCLOSE WIRELESS AUDIO TRANSMISSION SYSTEMS disclose wireless audio transmission systems. Each of these patents is hereby incorporated by reference herein. In some of these patents is described packet transmission of wireless data to a set of nodes for playback by the nodes.

In any wireless transmission system, it is desirable to ensure integrity of wireless data transmissions amongst nodes. In a packet transmission system, packets can be lost. Packet loss is particularly problematic in wireless audio or audiovisual systems as the resultant packet loss may in turn cause corruption of the audio data.

SUMMARY OF THE INVENTION

One particular embodiment of the present invention includes a method of transmitting data from a source device to a set of sink devices, the method comprising the steps of: (a) initially the source device broadcasting packet data to said sink devices; (b) the sink devices collecting packet data and identifying missing packets that have been missed; (c) upon a sink device detecting a missing packet, the sink device separately requesting the transmission of the missing packet by the source device; and (d) the source device separately sending missing data packets.

The step (a) further can comprise initially broadcasting packets to the sink devices using a User Datagram Protocol (UDP) transmission.

The step (c) further can comprise the sink device setting up a Transaction Control Protocol (TCP) interconnection with the source device to request transmission of the missed packet.

The source device transmits packets multiple times to the sink devices and the sink devices only request a data packet if they miss receiving all of the source transmissions.

The data preferably can include compressed audio data.

The sink devices store the packets in a buffer and the sink devices separately notify the source device of the current state of the buffer, and the source device adjusts its transmission rate based on the state of the sink buffers.

The sink devices separately notify the source device of the packets received by the sink devices.

BRIEF DESCRIPTION OF THE DRAWINGS

Preferred forms of the present invention will now be described with reference to the accompanying drawings in which.

DESCRIPTION OF EXAMPLE EMBODIMENTS

Like the aforementioned patent applications, the embodiments of the present invention are directed to playing a digital media stream in a networked environment. The digital media is streamed across a standard TCP/IP 802.11a/b/g wireless network, e.g., in the home. Of course, other embodiments can use alternative wireless networks.

Figure 1:
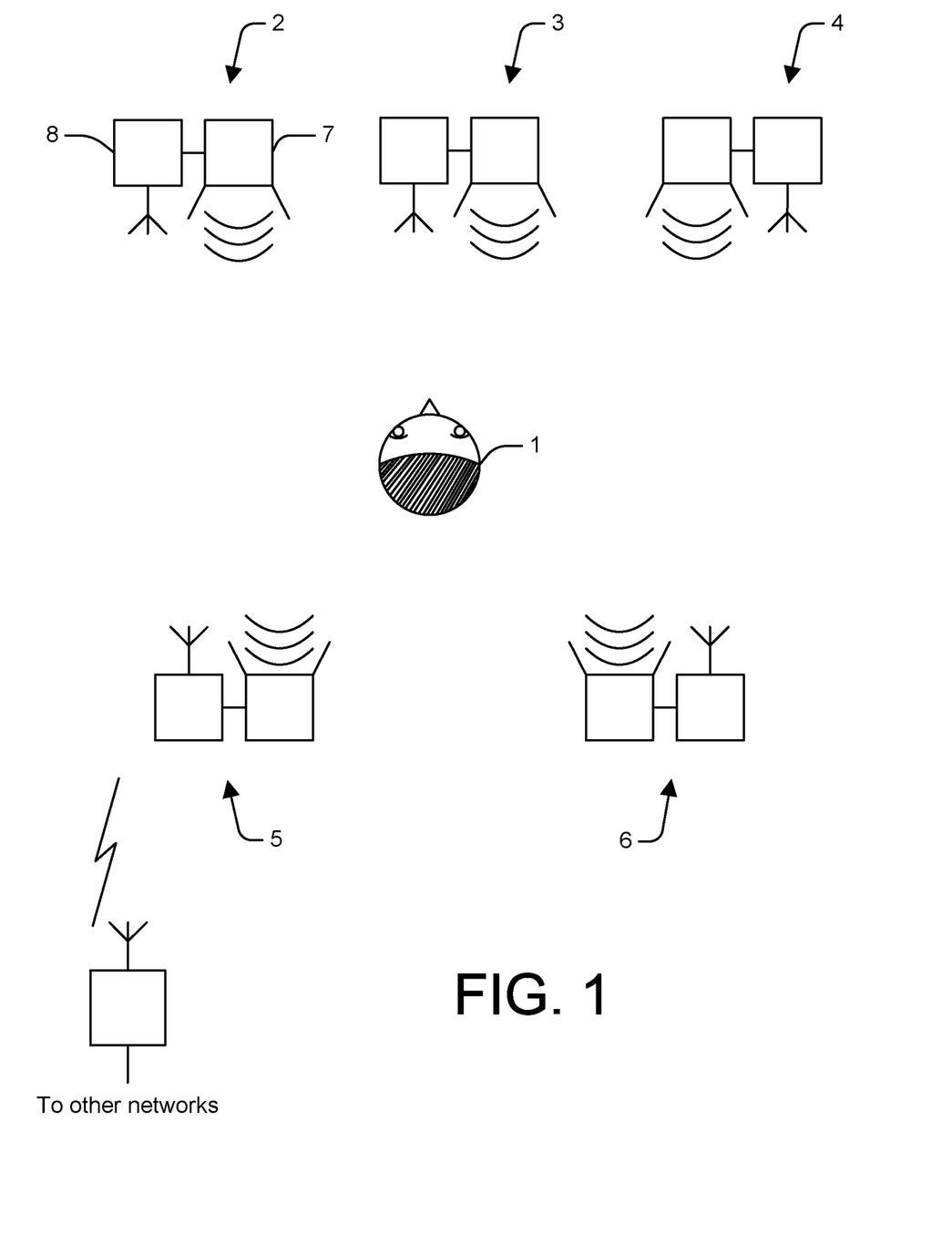
FIG. 1 illustrates schematically an example audio playback environment for playback of multi-channel audio.

The arrangement for data streaming can be as illustrated in FIG. 1 where a listener 1 is surrounded by a set of speaker emission control units 2-6. Each speaker emission control unit includes a speaker for the emission on an appropriate channel e.g. 7 and a processing unit e.g. 8 which receives the wireless packet transmissions in the 802.11 network and processes the packets for output.

The processing unit 8 can provide for multifunctional operations and can include a CPU unit (including memory) running a high end operating system such as the Linux operating system, a 802.11 chipset for implementation of the packet wireless transmission and various FPGA etc. so as to implement full functionality.

For multi channel audio playback, the central problem to be solved is the transfer of data from a source which can comprise one of the nodes e.g. 5 to multiple data sinks whilst keeping within the constraints of the available network bandwidth. Hence the node 5 acts as a source for transmission of data over the wireless network to the other speaker control units 2-4 and 6.

In one embodiment, wireless transmission is carried out using the User Datagram Protocol (UDP) that allows broadcast packets to be sent. This means that the node 5 can send packets once across the network and they are received simultaneously by each of the sink devices 2-4 and 6. Unfortunately, UDP does not provide for any reliability mechanism of receipt. In one embodiment, UDP is used to simply transmit data in a broadcast mode.

Figure 5:
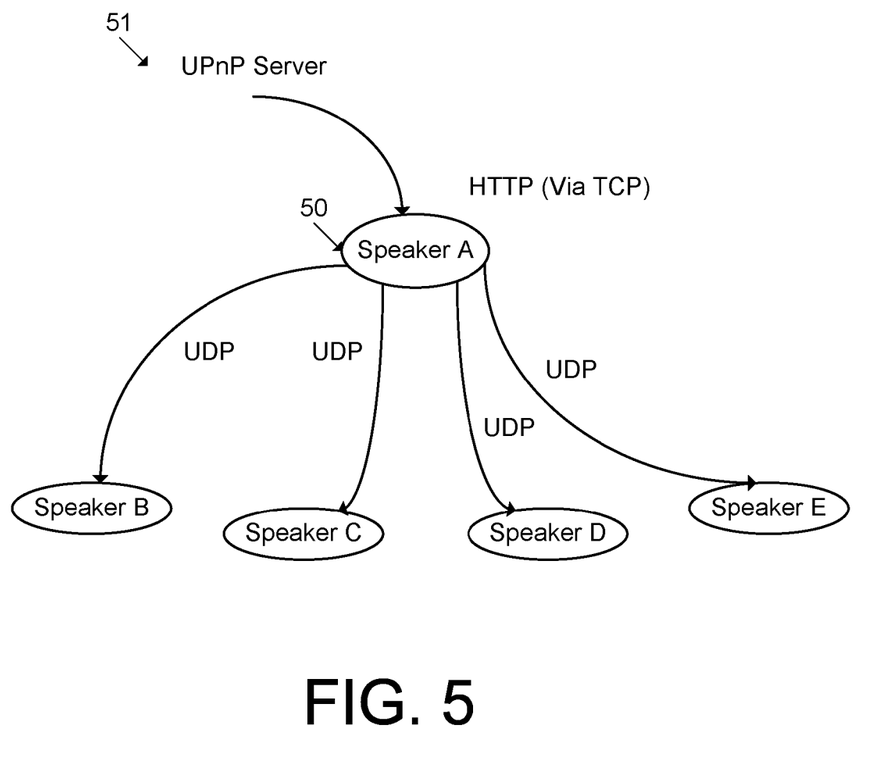
FIG. 5 illustrates a form of data transmission using the UPnP Standard.

In one embodiment, data transmissions are in accordance with the Universal Plug and Play (UPnP) media standard. Universal Plug and Play (UPnP) defines a media system consisting of Media Renderers, Media Servers, and Control Points. Media Renderers are the end devices e.g. 2-6 responsible for physically reproducing the media, Media Servers contain media files and present an interface for Renderers to access these files, and a Control Point allows a user to control the playback of music from any given Media Server to any given Media Renderer. Turning to FIG. 5, the arrangement for rendering of audio streams involves a UPnP server device 51 serving audio to a rendering device which is implemented by one of the speakers units e.g. 50. In accordance with the UPnP standard, communications are normally implemented by way of HTTP protocols. The speaker device 51 then provides audio streams for each of the attached devices in accordance with a UDP protocol.

Returning to FIG. 1, the collection of devices 2-6 normally use a primary renderer e.g. element 5 that controls all the other devices in that group. This primary renderer device presents a standard UPnP Media AV Transport service. This service has the ability to be controlled by a UPnP Control Point, setting the requested media files to play and executing commands such as Play, Pause, Stop, etc.

UPnP Media Servers predominantly serve media files to Renderers using the Hypertext Transfer Protocol (HTTP). The Control Point is able to browse or search through the files presented by a Media Server, and instruct a Media Renderer to set up the transfer of a given file. In one embodiment, the primary Media Renderer, in response to the appropriate UPnP commands sent from a Control Point, initiates a connection with a UPnP Media Server, and begins to download audio data files via HTTP.

The audio packets are transmitted in accordance with the UDP protocol. Under this protocol, the audio data is divided into fixed size packets and a packet header is added.

Figure 2:
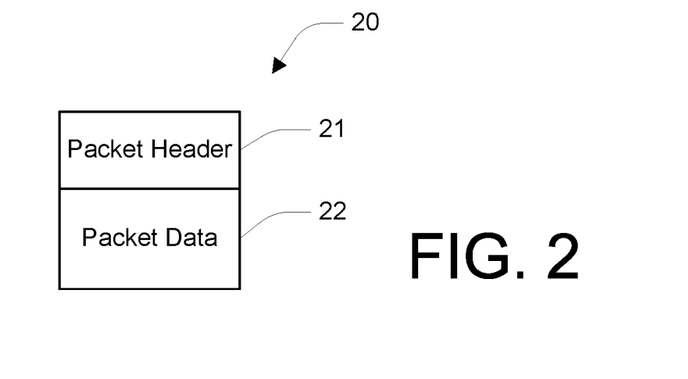
FIG. 2 illustrates a data packet according to one embodiment.
Figure 3:
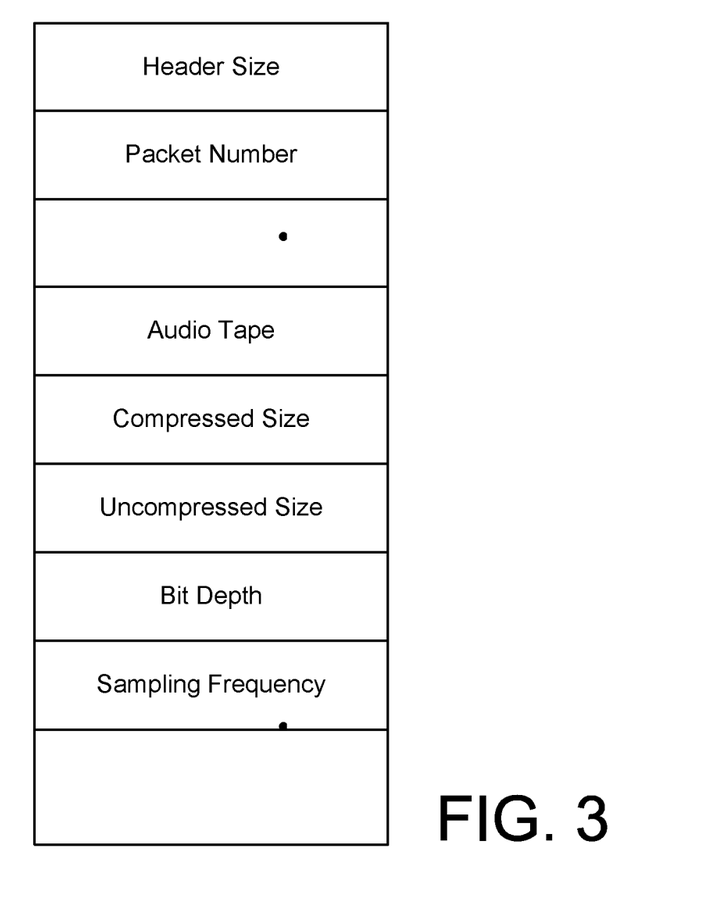
FIG. 3 illustrates further details of the data packet of FIG. 2.

FIG. 2 illustrates the packet header 21 and packet body 22 of an overall packet 20 according to one embodiment. FIG. 3 illustrates further details of the data packet of FIG. 2. The Packet 20 is broadcast across the network to each of the sync devices using the UDP protocol.

By using broadcast UDP packets, the bandwidth overhead of sending every packet individually to the collection of devices is eliminated. Each device receives these broadcasted packets and reconstructs them into a coherent stream of data.

As discussed, due to the nature of wireless networking, packets can sometimes be garbled or otherwise lost by the time they are received via this UDP broadcast process. A retransmission scheme has been developed to ensure that in the event of missing packets, the data stream can continue.

Each UDP packet 20 has a unique sequence number, which represents the order in which it needs to be reconstructed into the data stream. These sequence numbers are added to the data in the packet header as mentioned above. A sink device will expect to receive each UDP packet in order, so it can easily detect any missed packets in the stream by comparing the sequence number of the next expected packet with the sequence number of a packet just received.

Figure 4:
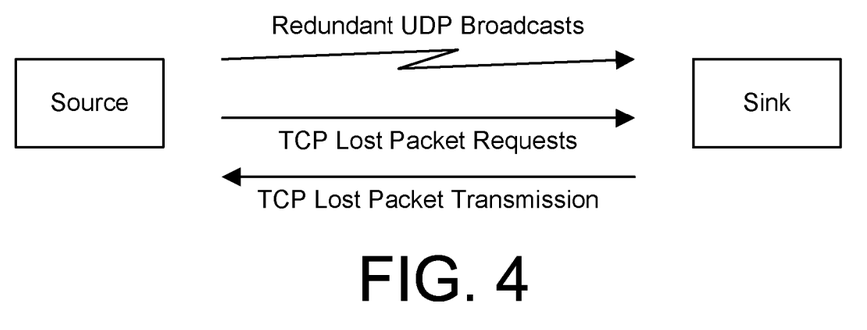
FIG. 4 illustrates a data packet transmission protocol used in an embodiment of the invention.

FIG. 4 illustrates a data packet transmission protocol used in an embodiment of the invention for dealing with missing packets. Once a device has determined that certain packets are missing, it requests a retransmission of these packets from the primary renderer. In addition to listening for UDP broadcasts, each device in the group opens a Transmission Control Protocol (TCP) connection to the primary media renderer on start up, in order to request retransmission of missing packets. The retransmission requests are performed using a protocol containing a retransmit command code and the packet numbers required.

Redundant Transmission

In some situations, low audio latency is critical, for example, when playing a stream of audio and associated video from a DVD player. Because the received data buffer must be kept extremely small in such a situation, devices may not always have time to request a retransmission of a packet before that packet is due to be played. To preemptively guard against missing packets that cannot be retransmitted in time, redundant transmission of the original packets over UDP is used to reduce the chances that a particular packet will be missing, and hence negate the need for an individual retransmission of that packet.

This redundant transmission involves simply sending the packet once, delaying by a certain amount of time and then retransmitting exactly the same data across the network again. At the receiving end, if a sink device has already successfully received a packet with the same sequence number, it can discard the duplicate packet. For certain media types, such as uncompressed PCM data, network bandwidth makes it difficult to use this redundant transmission scheme, but for compressed Dolby Digital streams such as that often produced by a DVD player, it has been found in practice that packets can be retransmitted several times to greatly reduce the probability of a missing packet.

It is fortunate that PCM data is virtually never associated with video material and somewhat higher latencies are therefore tolerable for PCM transmission. The system adapts its latency levels based on the nature of the source material.

Buffer State Feedback

As the data may be sent at a rate significantly faster than the rate of playback to ensure that there is always sufficient data stored in the buffer and to allow retransmissions of missing packets, each sink device implements a buffer state feedback mechanism to prevent the overflow of this buffer. Using the same TCP connection mentioned above, each speaker periodically informs the primary device about the size of its audio data buffer. If any of the sink slave buffers are reported to be larger than an acceptable cut off level, the primary source device backs off the UDP broadcasting rate until the reported buffer size decreases.

To prevent buffer overflows on the primary device, which must keep a history of packets sent in case a retransmission is requested by another device, an acknowledgement system is used. After a set number of packets have been received successfully, each device sends back an 'acknowledgement' packet. This acts as a common checkpoint; once the primary device has received acknowledgements up to a certain level from all connected devices, it can discard any packets earlier than the lowest acknowledged packet, as all of the other devices have reported they have successfully received data up to that packet. This mechanism allows the primary device to keep memory usage acceptably low.

While an embodiment has been described for operation conforming to the IEEE 802.11 standard, the invention may be implemented using wireless devices conforming to other standards and for other applications, including, for example other WLAN standards and other wireless standards. Applications that can be accommodated include, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from these discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term DSP device, and "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive part(s). For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a wireless output unit. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, embodiments of the present invention may take the form of a method, an entirely hardware embodiment, an entirely software embodiment or an embodiment combining software and hardware parts. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. For example, the term "carrier medium" shall accordingly be taken to include, but not be limited to, solid-state memories, and optical and magnetic media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive parts. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The foregoing describes preferred forms of the present invention. Modifications, obvious to those skilled in the art can be made thereto without departing from the scope of the invention.

We claim:

1. In a wireless network environment, a method of wirelessly transmitting data from a source device to a set of sink devices over a wireless network, the method comprising the steps of:
   (a) said source device broadcasting packet data to said sink devices;
   (b) said sink devices collecting packet data and identifying missing packets that have been missed;
   (c) upon a sink device detecting a missing packet, said sink device separately requesting the transmission of said missing packet by said source device, said sink device setting up a Transaction Control Protocol (TCP) interconnection with the source device to request transmission of said missed packet; and
   (d) said source device separately re-transmitting missed data packets in response to requests from sink devices; wherein:
   said source device is configured to transmit a given packet multiple times to the sink devices by default, and in the case that a respective sink device misses receiving all of the source transmissions of that given data packet, the respective sink device is configured to request the retransmission of the given data packet by said source device, such that the source device separately re-transmits that given data packet;
   each sink device is configured to store said packets in a respective buffer and provide to said source device data indicative of the current state of said respective buffer; and said source device is configured to adjust the rate at which said packet data is transmitted based on receiving the data indicative of the current state of the buffers of said sink devices.

2. A method as claimed in claim 1 wherein said step (a) further comprises initially broadcasting packets to the sink devices using a User Datagram Protocol transmission.

3. A method as claimed in claim 1 wherein
each sink device is configured to store said packets in a respective buffer and provide to said source device data indicative of the size of its respective buffer; and
said source device is configured to, in the case that any of the sink device buffers are reported to be larger than an acceptable cut off level, reduce a broadcasting rate of packet data until the reported buffer size decreases.

4. A method as claimed in claim 1 wherein said data includes compressed audio data.

5. A method as claimed in claim 1 wherein
said source device is configured to maintain a source buffer of data packets that have been transmitted to said sink devices, thereby to fulfill requests for re-transmission of missed packets;
each sink device is configured to provide to said source device data indicative of a set of sequential data packets that were successfully received by that sink device; and
the source device is configured to delete a given packet from the source buffer in the event that all sink devices provide to the source device data indicative of successful receipt of that packet.

6. A method at a sink device of a set of sink devices of receiving data from a source device over a wireless network, the method comprising:
(a) receiving a plurality of packets at the sink device as a result of the source device broadcasting an ordered sequence of packets including audio data;
(b) collecting the received plurality and ascertaining whether packets in the sequence have not been received;
(c) for a packet that has been ascertained to have not been received, requesting the source device to transmit the not received packet, said sink device setting up a Transaction Control Protocol (TCP) interconnection with the source device to request transmission of said packet ascertained to have not been received;
(d) receiving the not received packet as a result of the source device transmitting the not received packet;
(e) storing said received packets in a buffer prior to rendering those packets; and
(f) providing to the source device data indicative of the state of the buffer, such that the source device varies a rate at which packet data the packets are broadcast responsive to the state of the sink device buffer.

7. In a wireless network environment, a method at a source device of transmitting packet data from the source device to a set of sink devices over a wireless network, the method comprising the steps of:
(a) broadcasting packet data to said sink devices at a broadcast rate, such that any of the sink devices can collect packet data received from the sink device, identify any packets that have been missed, and upon detecting a missing packet, request the transmission of said missing packet by the source device;
(b) receiving one or more requests from a particular sink device to send one or more missing data packets, said one or more requests being provided a result of the particular sink device setting up a Transaction Control Protocol (TCP) interconnection with the source device to request transmission of the one or more missing packets; and
(c) re-transmitting the one or more missing data packets to the particular sink device;
wherein said source device is configured to receive from the sink devices data indicative of the state of data buffers respectively maintained at each of those sink devices and adjust the broadcast rate in response to that data.

8. A method as claimed in claim 7, wherein said step (a) further comprises initially broadcasting packets to the sink devices using a User Datagram Protocol transmission.

9. A method as claimed in claim 7, wherein said source device transmits packets multiple times to the sink devices, and said sink devices only request a data packet if they miss receiving all of the source transmissions.

10. A method as claimed in claim 7 wherein said data packets include compressed audio data.

11. Logic encoded in one or more tangible media for execution and when executed operable to cause a sink device of a set of sink devices to carry out a method of receiving data from a source device over a wireless network, the method comprising:
(a) receiving a plurality of packets at the sink device as a result of the source device broadcasting an ordered sequence of packets including audio data;
(b) collecting the received plurality and ascertaining whether packets in the sequence have not been received;
(c) for a packet that has been ascertained to have not been received, requesting the source device to transmit the not received packet, said sink device setting up a Transaction Control Protocol (TCP) interconnection with the source device to request transmission of said packet ascertained to have not been received;
(d) receiving the not received packet as a result of the source device transmitting the not received packet;
(e) informing the source device that a set of sequential data packets were received by that sink device.

12. Logic encoded in one or more tangible media for execution and when executed operable to cause a source device in a wireless network environment to carry out a method of transmitting packet data over a wireless network from the source device to a set of sink devices, the method comprising the steps of:
(a) broadcasting packet data to said sink devices, such that any of the sink devices can collect packet data received from the sink device, identify any packets that have been missed, and upon detecting a missing packet, request the transmission of said missing packet by the source device;
(b) receiving one or more requests from a particular sink device to send one or more missing data packets, the particular sink device setting up a Transaction Control Protocol (TCP) interconnection with the source device for the requests to send the one or more missing packets; and
(c) sending the one or more missing data packets to the particular sink device;
wherein said source device is configured to maintain a source buffer of data packets that have been transmitted to said sink devices, thereby to fulfill requests for re-transmission of missed packets, and wherein said source device is configured to delete a given packet from the source buffer in the event that all sink devices provide to the source device data indicative of successful receipt of that packet.

13. A method according to claim 6 wherein (f) includes providing to said source device data indicative of the size of the buffer, wherein said source device is configured to, in the case that any of the sink device buffers are reported to be larger than an acceptable cut off level, reduce the broadcasting rate of packet data until the reported buffer size decreases.

14. A method according to claim 7 wherein the data indicative of the state of data buffers is indicative of the size of the buffers, and wherein said source device is configured to, in the case that any of the sink device buffers are reported to be larger than an acceptable cut off level, reduce the broadcasting rate of packet data until the reported buffer size decreases.

15. A method according to claim 11 further comprising:
   (f) storing said received packets in a buffer prior to rendering those packets; and
   (g) providing to the source device data indicative of the state of the buffer, such that the source device varies the rate at which packet data is transmitted responsive to the state of the sink device buffer.

\* \* \* \* \*